No. 761,803. PATENTED JUNE 7, 1904.
G. H. WICKELBERG.
SKIRT SPREADER.
APPLICATION FILED JAN. 7, 1904.
NO MODEL.

WITNESSES:
Arlita Adams
Cilla White

INVENTOR
Gerda H. Wickelberg
BY Frank E. Adams
ATTORNEY

No. 761,803. Patented June 7, 1904.

UNITED STATES PATENT OFFICE.

GERDA HILDEGARD WICKELBERG, OF SEATTLE, WASHINGTON.

SKIRT-SPREADER.

SPECIFICATION forming part of Letters Patent No. 761,803, dated June 7, 1904.

Application filed January 7, 1904. Serial No. 188,145. (No model.)

*To all whom it may concern:*

Be it known that I, GERDA HILDEGARD WICKELBERG, a subject of the King of Sweden and Norway, and a resident of the city of Seattle, in the county of King and State of Washington, have invented certain new and useful Improvements in Skirt-Spreaders, of which the following is a specification.

My invention relates to improvements in skirt-spreaders, and has for its object to provide a simple and inexpensive device for holding wash-skirts to form while drying and which embodies essential features of adjustability, utility, and general efficiency.

The above-mentioned and other desirable objects are attained by the construction, combination, and arrangements of parts as disclosed on the accompanying drawings, set forth in this specification, and succinctly pointed out in the appended claims.

Figure 1:
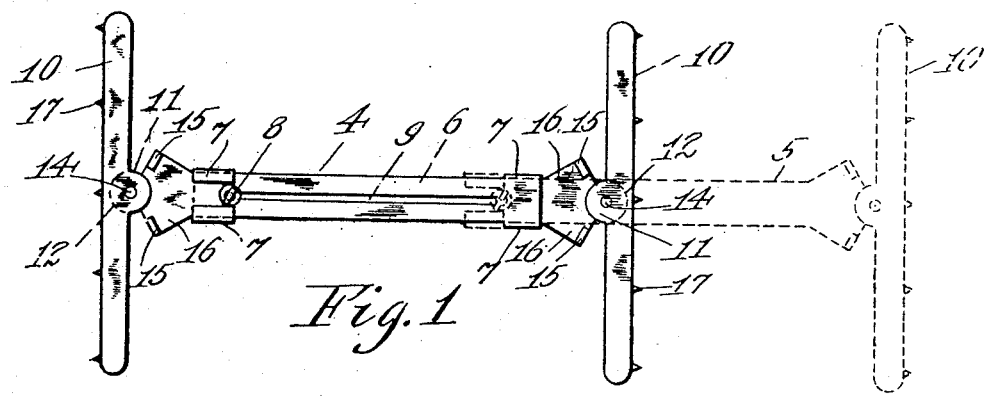
Figure 2:
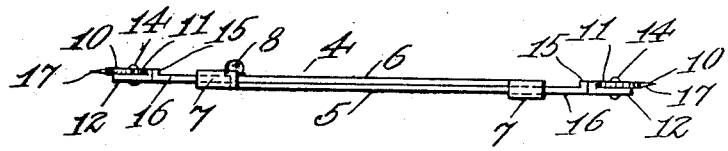
Figure 3:
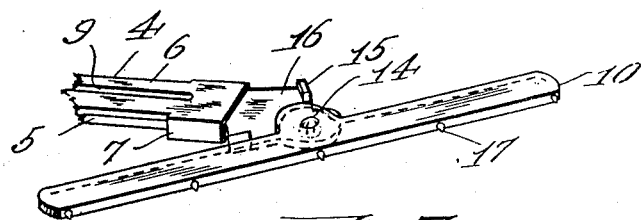

With reference to the drawings filed herewith and bearing like reference characters for corresponding parts throughout, Figure 1 is a plan view of the device and shows by broken lines the positions of the parts when the device is expanded. Fig. 2 is an edge view of the device, and Fig. 3 is a view in perspective of one end thereof.

This device includes an extensible and contractible shank 4, composed of a pair of bars, as 5 and 6, which are suitably connected so as to slide longitudinally one upon the other and preferably consist of sections of suitable sheet metal, as aluminium, each section being formed with a laterally-projecting extension on each side edge at the inner end, and these extensions are bent over to embrace the side margin of the other bar and serve as guides 7 to hold the bars in slidable contact with each other. These shank-bars are conveniently secured or fastened together in adjusted positions by means of a thumb-screw 8, the shank of which fits slidably in a longitudinally-disposed slot 9 of extended length, provided in bar 6, and this screw is engaged in a screw-threaded aperture formed in the inner end portions of bar 5, so that bar 6 can be clamped between the head of the screw and bar 5 when the shank has been adjusted in conformity with the spread it is desired to give the skirt.

At the outer end of each of the shank-bars is a transversely-disposed cross-bar 10, which is pivotally connected substantially midway its ends with the shank-bar, so that it will swing thereon and conform to the taper of the skirt when the device is positioned therein. These cross-bars preferably consist of sections of suitable sheet metal, and they are each formed with a suitable pivot-lug 11, projecting from one side edge substantially midway the length of the bar, and the shank-bars are each formed with a pivot-lug 12 at the outer end, and suitable pivots, as 14, are engaged in corresponding apertures provided in these lugs to conveniently pivotally connect the cross-bars with the shank-bars. To conveniently limit the swing of the cross-bars, opposite stop-lugs, as 15, are arranged on the shank-bars rearwardly of the centers of movement of the cross-bars, and these lugs are carried on laterally-projecting wings, as 16, of triangular form and which are integral with the shank-bars, and these lugs consist of suitable extensions of the wings bent at right angles thereto and serve to keep the cross-bars from swinging into alinement with the shank, and thereby facilitate the placement of the device in the skirt. Along the outer side edges of the cross-bars are arranged a series of outwardly-projecting barbs 17, which are adapted to engage the fabric of the skirt and insure the position of the device.

To use this device to the best advantage, the wet skirt is suspended from a clothes-line or other suitable support by hanging it along the center of its front portion between the waistband and bottom. One or more of the devices are then inserted in the bottom end of the skirt, each being first placed in a horizontal position, with the cross-bars extending longitudinally of the skirt, and the shank then adjusted to spread the skirt as desired, when the cross-bars will conform to the taper of the skirt and the barbs thereon engage the fabric. If desired, one of the devices may also be arranged in the skirt at the waist to spread it open at this point. The skirt is thus prevented from stretching out of shape when it is heavy with water and is held to form while drying.

This device is simple and inexpensive of construction, has few parts likely to get out of order, and affords a satisfactory and convenient means for holding a wash-skirt to form while drying.

Having thus described my invention, what I claim, and desire to secure by Letters Patent, is—

1. A skirt-spreader comprising two shanks adjustable one on the other, wings projecting outwardly from the edges of said shanks at points adjacent their outer ends, stop-lugs carried by said wings, and cross-bars having pivot-lugs projecting between said stop-lugs and being pivoted to said shanks.

2. A skirt-spreader comprising two shanks formed from sheet metal, edge extensions formed integral therewith and being bent to form guides in which the opposite shank is slidably received, means for holding said shanks in their adjusted positions, outwardly-projecting wings carried by the end portions of said shanks, stop-lugs bent upwardly therefrom, pivot-lugs projecting from the outer ends of said shanks, cross-bars carrying pivot-lugs bearing on and pivoted to the first-named pivot-lugs, and barbs carried by said cross-bars.

Signed at Seattle, Washington, this 14th day of December, 1903.

GERDA HILDEGARD WICKELBERG.

Witnesses:
 ERNEST B. HERALD,
 ARLITA ADAMS.